(12) United States Patent
Wilson et al.

(10) Patent No.: US 8,255,881 B2
(45) Date of Patent: Aug. 28, 2012

(54) SYSTEM AND METHOD FOR CALCULATING SOFTWARE CERTIFICATION RISKS

(75) Inventors: Nathan Lee Wilson, Peoria, IL (US); Scott William Streitmatter, Dunlap, IL (US); Frank Chapman Bellrose, Pekin, IL (US); Bruce Gehlbach Howell, Morton, IL (US); Stanley Russell Kaniecki, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1105 days.

(21) Appl. No.: 12/213,428

(22) Filed: Jun. 19, 2008

(65) Prior Publication Data

US 2009/0319980 A1 Dec. 24, 2009

(51) Int. Cl.
*G06F 9/44* (2006.01)
*G06F 11/00* (2006.01)

(52) U.S. Cl. ........ 717/131; 717/100; 717/141; 717/142; 714/38

(58) Field of Classification Search .......... 717/101–103, 717/131–133, 141–144, 38; 714/38
See application file for complete search history.

(56) References Cited

U.S. PATENT DOCUMENTS

| | | | |
|---|---|---|---|
| 6,219,805 B1 * | 4/2001 | Jones et al. ............ | 714/38.1 |
| 6,546,506 B1 | 4/2003 | Lewis | |
| 6,895,383 B2 * | 5/2005 | Heinrich .................. | 705/7.28 |
| 6,996,627 B1 | 2/2006 | Carden | |
| 7,072,796 B2 * | 7/2006 | Kataoka ................... | 702/181 |
| 7,096,082 B1 | 8/2006 | Connelly | |
| 2003/0018952 A1 | 1/2003 | Roetzheim | |
| 2003/0070157 A1 | 4/2003 | Adams et al. | |
| 2003/0106039 A1 | 6/2003 | Rosnow et al. | |
| 2003/0188290 A1 | 10/2003 | Corral | |
| 2004/0098421 A1 | 5/2004 | Peng | |
| 2004/0128647 A1 | 7/2004 | Gibbons | |
| 2004/0143811 A1 | 7/2004 | Kaelicke et al. | |
| 2004/0187103 A1 | 9/2004 | Wickham et al. | |
| 2005/0114828 A1 | 5/2005 | Dietrich, Jr. et al. | |
| 2005/0114829 A1 | 5/2005 | Robin et al. | |
| 2005/0216879 A1 | 9/2005 | Ruhe | |
| 2005/0283751 A1 * | 12/2005 | Bassin et al. ............ | 717/100 |
| 2007/0006161 A1 | 1/2007 | Kuester et al. | |
| 2007/0192763 A1 | 8/2007 | Helvick | |
| 2009/0043637 A1 * | 2/2009 | Eder .......................... | 705/10 |

OTHER PUBLICATIONS

Barry W. Boehm, Software Risk Management: Principles and Practices, Jan. 1991, Defense Advanced Research Projects Agency, pp. 32-41.*
Musa, Software-Reliability-Engineered Testing Practice, ICSE 97 Boston MA USA, Copyright 1997 ACM, pp. 628-629.*

* cited by examiner

*Primary Examiner* — Wei Zhen
*Assistant Examiner* — Satish Rampuria
(74) *Attorney, Agent, or Firm* — Finnegan, Henderson, Farabow, Garrett & Dunner LLP (57) ABSTRACT

A method for calculating a composite risk is disclosed. The method may include receiving information associated with a plurality of risk factors. The information may include a timeline for each risk factor, and the timeline may include a plurality of discrete time points. The method may further include determining risk values indicative of risk levels of each risk factor associated with the plurality of discrete time points. The method may also include calculating the composite risk using the determined risk values and a relationship between the composite risk and the plurality of risk factors. The composite risk may include a plurality of composite risk values associated with the plurality of discrete time points.

18 Claims, 4 Drawing Sheets

| OPERATION SYSTEM RELEASE DATE | | |
|---|---|---|
| OS NUMBER | VERSION | RELEASE | EOS |
| — | V1 | 06/01/2004 | 01/01/2009 |
| 1 | V2 | 01/01/2006 | 01/01/2010 |
| 2 | V3 | 01/01/2008 | 01/01/2012 |
| 3 | V4 | 06/01/2008 | 06/01/2013 |

250

| HARDWARE CHANGE | |
|---|---|
| START | FINISH |
| 06/01/2008 | 12/01/2008 |

260

| INFRASTRUCTURE CHANGE | |
|---|---|
| START | FINISH |
| 04/01/2007 | 04/01/2007 |
| 10/01/2007 | 10/10/2007 |

210

| DATE RANGE | |
|---|---|
| START | FINISH |
| 04/01/2007 | 05/01/2010 |

220

| EXISTING SOFTWARE LIFE CYCLE | | |
|---|---|---|
| | RISK | EOS DATE |
| DBS A | 2.5 | 12/01/2010 |
| DBS B | 3.5 | 06/01/2009 |

230

| NEW SOFTWARE DEVELOPMENT LIFE CYCLE | | | |
|---|---|---|---|
| PHASE | START | END | RISK |
| BEFORE DEVELOPMENT | XXXX | 01/01/2007 | 1 |
| DEVELOPMENT | 01/01/2007 | 03/01/2007 | 4.5 |
| INTEGRATED TEST | 03/01/2007 | 05/01/2007 | 7 |
| UAT TESTING | 05/01/2007 | 08/01/2007 | 8 |
| PILOT | 08/01/2007 | 09/01/2007 | 9 |
| POST PILOT | 09/01/2007 | 09/01/2007 | 3.5 |

SYSTEM AND METHOD FOR CALCULATING SOFTWARE CERTIFICATION RISKS

TECHNICAL FIELD

This application relates to a system and method for calculating risks, and more particularly, to a system and method for calculating software certification risks.

BACKGROUND

Software may be certified to users for running on various environment components, and performance of the software may be largely dependent on the stability of these environment components. These environment components may include, for example, the operating system (OS), hardware and infrastructures. Various risks may exist in a dynamic software development environment due to changes of these environment components. These changes may cause risks to the certification of software. For example, risks may be higher for certifying software right after a hardware change. Thus, there is a need to consider these environmental changes while planning the software certification to mitigate or avoid risks.

Furthermore, changes to one or more environment components may occur and these changes may be out-of-sync. For example, an operating system may be released in March, 2008 and an infrastructure change may occur two months later in May, 2008. The dynamic nature of the environmental changes may introduce additional complexity in planning the software certification, as the risks associated with different environment factors may peak at different times. Therefore, it is beneficial to calculate a composite risk that considers the combined effect of changes to the environment factors and to plan the software certification to minimize the overall risk.

Conventionally, risk evaluation and software certification planning are performed manually by experienced software developers. Such manual evaluation processes may be time-consuming, as many software applications include multiple risk factors, each of which may need to be accounted for in order to properly evaluate software certification risks. Manual risk evaluation processes may also be subjective, as they rely largely on the particular experiences and predispositions of the software expert. Such subjectivity may result in inconsistencies in manual risk evaluation processes, particularly in situations where different software experts perform the risk evaluation process. Thus, in order to accurately and reliably perform software certification processes, an automated system and method for objective and repeatable evaluation of risks associated with software certification processes may be useful.

One method for automatically evaluating risks in software applications before release is described in U.S. Patent Publication No. 2005/0216879 to Ruhe ("the '879 publication"). The method described in the '879 publication comprises assigning stakeholder priorities to a set of requirements for software, defining a set of constraints on the requirements, and generating a release plan by evaluating algorithms operating on the stakeholder priorities. In particular, the '879 publication also describes performing a risk evaluation to address the inherent uncertainty associated with the implementation of certain features of software. A risk score is employed to indicate the risk associated with each given feature. The method described in the '879 publication obtains an overall risk score by adding up the risk scores associated with each feature, and compares the overall risk score with an upper bound to determine whether the risk is too high.

Although the method described in the '879 publication may be effective for evaluating risks associated with a software release at a given time, it may nevertheless be problematic. For example, although the method described in the '879 publication considers risks associated with one or more software features included in the software, it does not consider changes of the software development environment. Various types of risks associated with software certification may be caused by environment changes, and thus, by neglecting these changes, the '879 publication fails to account for several risk factors. Furthermore, the method described in the '879 publication also fails to consider the fluctuation of risks over time. The several risk factors may not peak at the same time, and therefore, the fluctuation of each risk is useful in determining the best time for certifying the software. In addition, while the method described in the '879 publication may be used to avoid releasing software when a high risk is present, it does not provide a user with the opportunity to plan the other factors of the software development environment, such that the software may be released at a desired time.

The disclosed system and method for calculating software certification risks are directed towards overcoming one or more of the shortcomings set forth above.

SUMMARY

In one aspect, a method for calculating a composite risk is disclosed. The method may include receiving information associated with a plurality of risk factors. The information may include a timeline for each risk factor, and the timeline may include a plurality of discrete time points. The method may further include determining risk values indicative of risk levels of each risk factor associated with the plurality of discrete time points. The method may also include calculating the composite risk using the determined risk values based on a relationship between the composite risk and the plurality of risk factors. The composite risk may include a plurality of composite risk values associated with the plurality of discrete time points.

In another aspect, a risk calculator for calculating a composite risk is disclosed. The risk calculator may include a storage device configured to store information associated with a plurality of risk factors. The information may include a timeline for each risk factor, the timeline including a plurality of discrete time points, and risk values indicative of risk levels of each risk factor associated with the plurality of discrete time points. The risk calculator may further include a processor coupled to the storage device. The processor may be configured to determine risk values indicative of risk levels of each risk factor associated with the plurality of discrete time points. The processor may be further configured to calculate the composite risk using the determined risk values based on a relationship between the composite risk and the plurality of risk factors. The composite risk may include a plurality of composite risk values associated with the plurality of discrete time points.

DETAILED DESCRIPTION

Figure 1:
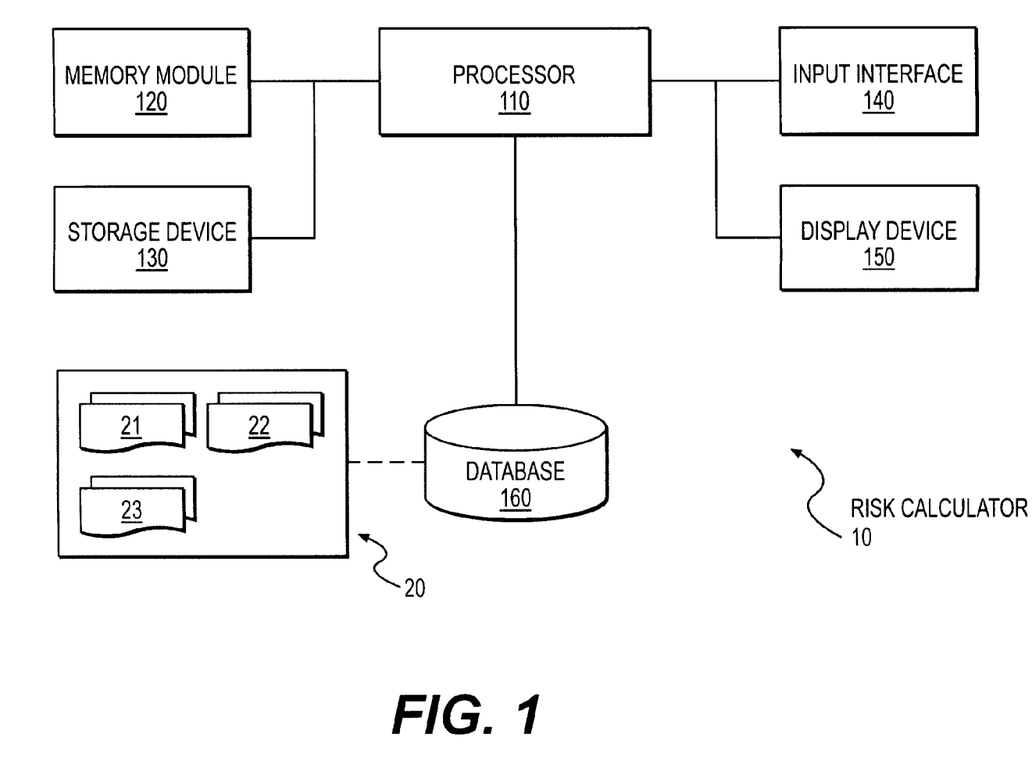
FIG. 1 provides a block diagram of a risk calculator, in accordance with an exemplary embodiment of the present disclosure.

FIG. 1 provides a block diagram of a risk calculator 10, in accordance with an exemplary embodiment of the present disclosure As illustrated in FIG. 1, risk calculator 10 may include, among other things, a processor 110, a memory module 120, a storage device 130, an input interface 140, a display device 150, and a database 160. It is contemplated that risk calculator 10 may include additional, fewer, and/or different components than those listed above. It is understood that the type and number of listed devices are exemplary only and not intended to be limiting.

Risk calculator 10 may be configured to calculate a composite risk for certifying software, based on risks associated with one or more risk factors, such as software development life-cycle, operating system release, hardware change, infrastructure change, etc. The composite risk may include a series of risk values corresponding to a series of discrete time points over a time period. Risk calculator 10 may be further configured to create a plot and display the composite risk as a function of time.

Processor 110 may be a central processing unit ("CPU"). Processor 110 may also include any appropriate type of general purpose microprocessor, digital signal processor, or microcontroller. Processor 110 may execute sequences of computer program instructions to perform various processes that will be explained later. Processor 110 may be configured as a separate processor module dedicated to risk calculation. Alternatively, processor 110 may be configured as a shared processor module for performing other functions unrelated to risk calculation. Processor 110 may also include one or more printed circuit boards, and/or a microprocessor chip.

Memory module 120 may include one or more memory devices including, but not limited to, a ROM, a flash memory, a dynamic RAM, and a static RAM. The computer program instructions may be accessed and read from a ROM in memory module 120, or any other suitable memory location, and loaded into a RAM for execution by processor 110. Storage device 130 may include any appropriate type of mass storage provided to store any type of information that processor 110 may need to operate. For example, storage device 130 may include one or more hard disk devices, optical disk devices, or other storage devices to provide storage space.

Both memory module 120 and storage device 130 may be configured to store information used by processor 110. For example, memory module 120 and/or storage device 130 may be configured to store a look-up table containing risk values at a plurality of discrete time points for a plurality of risk factors. For example, the look-up table may include a series of risk values, as a function of time, in response to a hardware change. Each risk value may be a number normalized in a defined range. Memory module 120 and/or storage device 130 may also be configured to store desired software certification times, entered by a user of risk calculator 10.

In one embodiment of the present disclosure, database 160 may store data used by risk calculator 10, such as the look-up table containing time varying risk values associated with a plurality of risk factors. Database 160 may also include analysis and organization tools for analyzing and organizing the information contained therein.

Input interface 140 may be provided for a user to input information to risk calculator 10. Input interface 140 may include a keyboard, a switch, a mouse, and/or a touch screen. Input interface 140 may be coupled to processor 110 via data buses, communication cables, wireless networks, or other communication mediums. According to one embodiment, input interface 140 may include a graphic interface for user inputs. Input interface 140 may be configured to receive input from a user, and send the information to processor 110 for processing or to memory module 120/storage device 130 for storage. For example, input interface 140 may be configured to receive timelines associated with various risk factors. Each timeline may include one or more time periods during which the corresponding risk factor changes. For another example, input interface 140 may be configured to receive a risk look-up table input by a user and send the table to storage device 130.

Display device 150 may be, for example, a computer, an operator panel, or an LCD. According to one embodiment, display device 150 may be an integral part of input interface 140. Display device 150 may be coupled to processor 110 via communication cables, wireless networks, or other communication mediums. Display device 150 may be configured to receive and display the software certification risk as a time varying curve in a plot. Display device 150 may further include an audio unit and provide an audible indication when any problems occur with the risk calculation process.

Risk calculator 10 may be operated by a software development department and, as such, access to its contents may be limited to certain authorized personnel, such as, software engineers. Furthermore, different personnel may have different levels of access depending on the type of information or content they are authorized to view. Access may be regulated using any suitable password application known in the art. Data transferred to and from risk calculator 10 may be protected using encryption software and other protection schemes, as would be apparent to one skilled in the art.

Risk calculator 10 may include one or more software applications, including, for example, a risk calculation tool 20. Risk calculation tool 20 may run on processor 110, and may be accessed by authorized users. Consistent with one embodiment, risk calculation tool 20 may also be accessed by remote users via their respective computers and a network, such as, for example, the Internet. It is also contemplated that risk calculation tool 20 may be stored on a computer readable medium, such as a hard drive, computer disk, CD-ROM, or any other suitable medium, and may run on other types of systems similar to risk calculator 10, such as a personal computer.

Consistent with one embodiment of the present disclosure, risk calculation tool 20 may further include one or more modules, including, for example, a risk database generation module 21, a risk calculating module 22, and a risk plot generating module 23. Risk database generation module 21 may be configured to create a risk look-up table containing time varying risk values associated with various risk factors. Consistent with one embodiment of the present disclosure, risk database generation module 21 may include data collecting tools such as a voice of business (VOB) survey tool, and/or data analysis tools such as a Failure Mode Effects Analysis (FMEA) tool. For example, risk database generation module 21 may be used to collect inputs regarding risks associated with various risk factors from respective subject matter experts, using a VOB survey tool. Risk inputs associated with an operating system release, for example, may be collected from an operating system expert, and risk inputs associated with hardware change may be collected from a hardware expert. Risk database generation module 21 may also be used to analyze the input of risks using an FMEA tool and derive a series of time varying risk values for each risk factor. The derived time varying risk values may be stored as a look-up table in storage device 130 or database 160.

Risk calculating module 22 may be configured to calculate a composite risk, as a function of time, based on the risk look-up table. For example, risk calculating module 22 may retrieve risk values from the risk look-up table according to user input information. For example, the input information may include a timeline associated with changes of each risk factor. Risk calculating module 22 may then calculate the composite risk according to a formula pre-programmed in risk calculating module 22. The formula may define a relationship between the composite risk and the plurality of risk factors. The calculated composite risk may include a series of time varying risk values. Risk calculating module 22 may be further configured to determine a best time for certifying the software, which corresponds to the lowest composite risk value.

Consistent with one embodiment, risk calculating module 22 may also be configured to rate the composite risk based on a rating criteria. The rating criteria may define a plurality of risk levels and each risk level corresponds to a range of risk values. For example, the risk values may be normalized within a range of 0-10, where 0 may correspond to the lowest risk and 10 may correspond to the highest risk. Risk values within the 0-2 range may be rated as "negligible risk", risk values within the 3-4 range may be rated as "small risk," risk values within the 5-6 range may be rated as "medium risk," risk values of 7 may be rated as "high risk," and risk values within the 8-10 range may be rated as "lofty risk" that should be avoided at all cost. Consistent with one embodiment, the rating criteria may be pre-programmed in risk calculating module 22.

Risk plot generating module 23 may be configured to generate a plot based on the calculated composite risk. For example, the plot may include a risk axis and a time axis and the composite risk may be displayed as a curve between the two axis. Risk plot generating module 23 may be further configured to display the best time for certifying the software, which corresponds to the lowest composite risk value.

Processor 110 may be configured to execute risk calculation tool 20. Consistent with one embodiment, processor 110 may execute risk database generation module 21, risk calculating module 22, and risk plot generating module 23 in a sequential order. For example, processor 110 may execute risk database generation module 21 to send out risk surveys, communicate with input interface 140 to receive surveys returned by subject matter experts, and generate the risk look-up table. Next, processor 110 may communicate with input interface 140 to receive input information and execute risk calculating module 22 to calculate the composite risk. Processor 110 may further execute risk plot generating module 23 to create a plot for displaying the composite risk as a function of time, and communicate with display device 150 to display the plot.

Risk calculation tool 20 may include one or more views, in the form of charts, tables, spreadsheets, web pages, templates or any other similar organizational structures, for conveying information to a user, and receiving input from the user. For example, risk calculation tool 20 may include a graphic input interface 200, depicted in FIG. 2 as it might appear on display device 150. Graphic input interface 200 may include one or more fields for receiving and displaying data. Graphic input interface 200 may include a variety of possible alternatives and they may be grouped in one or more general categories.

Figure 2:
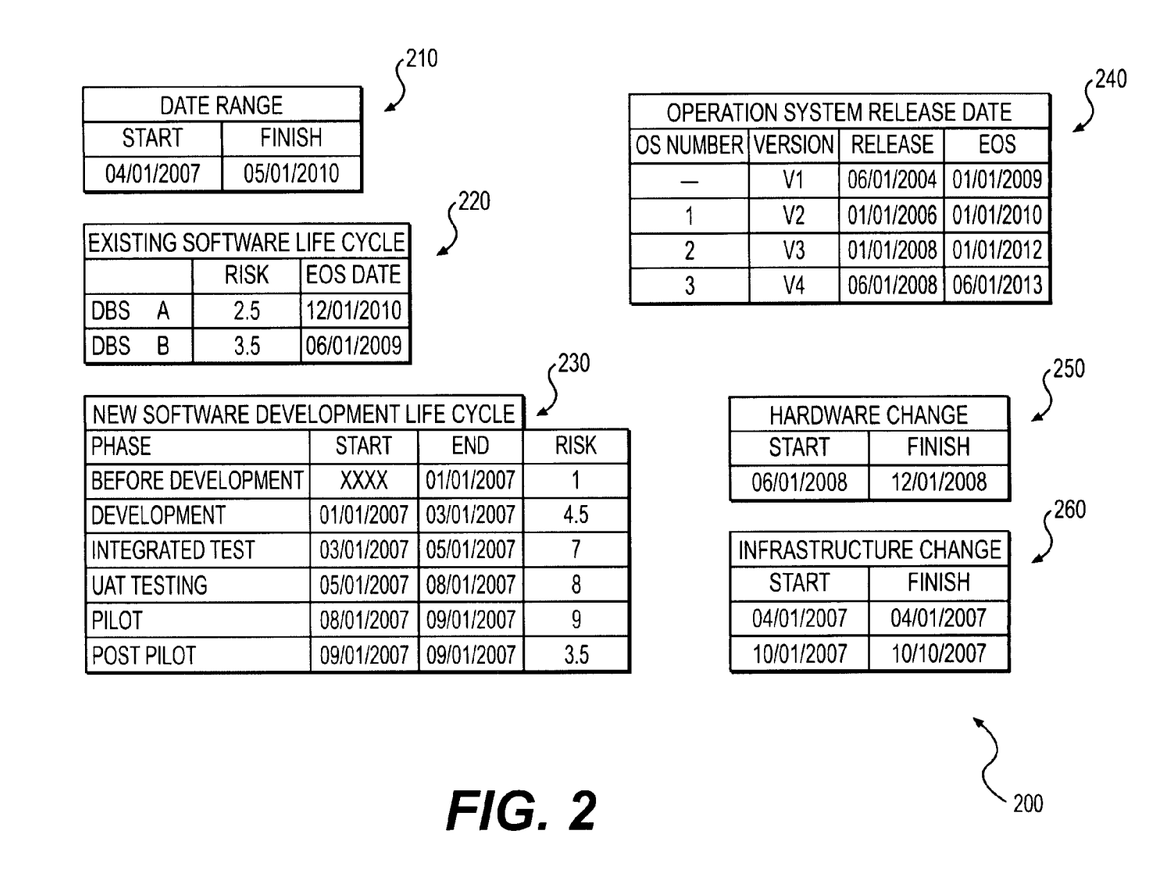
FIG. 2 provides an illustration of an graphic input interface of a risk calculator according to an exemplary embodiment of the present disclosure.

For example, graphic input interface 200 may include a date range input field 210, an existing software development life-cycle input field 220, a new software development life-cycle input field 230, an operating system release input field 240, a hardware change input field 250, and an infrastructure change input field 260. It should be understood that graphic input interface 200 may include fewer, more, or different general fields based on the characteristics and needs of risk calculator 10.

Authorized personnel may access risk calculation tool 20 and graphic input interface 200 via input interface 140. Administrators of risk calculator 10 may change or update the fields of graphic input interface 200 to adapt risk calculation tool 20 for use with new software or new risk factors. For example, graphic input interface 200 may be updated to include more or less risk factors into consideration.

Date range input field 210 may include a start date input field and a finish date input field. Consistent with one embodiment, the user may input the start date, and a default finish date that is three years after the start date may be automatically entered in the finish date input field. The user may also specify a different finish date.

Existing software development life-cycle input field 220 may include a risk input field and an end of support (EOS) date input field. Consistent with one embodiment, the user may input an EOS date and a risk level may be entered accordingly. For example, the risk level may remain static if the current software is in an after-pilot stage. Existing software development life-cycle input field 220 may allow the user to enter information for more than one software package. As shown in FIG. 2, a dealer business system A and a dealer business system B may be included.

New software development life-cycle input field 230 may include a start date input column, a finish date input column, and a risk input column. Each of these three columns may include a plurality of input fields that correspond to a plurality of phases of the software development life-cycle. For example, the software development life-cycle may include a before development phase, a development phase, an integrated test phase, a UAT testing phase, a pilot phase, and a post pilot phase. Consistent with one embodiment, the user may input a start date and an end date for each phase, and a risk associated with each phase may be automatically determined and entered in the risk input column. For example, the risk may be retrieved from the part of the risk look-up table that corresponds to new software development life-cycle. Consistent with one embodiment, the user may input a start date for each phase, and the end date for each phase may be automatically entered as being the same as the start date of the next phase. It is contemplated that graphic input interface 200 may include one or more new software development life-cycle input fields similar to input field 230, for one or more new software packages. It is understood that the number of listed input fields is exemplary only and not intended to be limiting.

Operating system release date input field 240 may include a version input field, a release date input date, and an EOS input date. Operating system release date input field 240 may allow the user to enter information for one or more software versions to be certified. As shown in FIG. 2, four versions (e.g., V1-V4) may be included. Consistent with one embodiment, the user may input both the release date and EOS date for each software version.

Hardware change input field 250 may include a start date input field, and a finish date input field. Hardware changes may include, for example, server upgrade, addition or removal of hardware components, hardware reconfiguration, etc. Infrastructure change input field 260 may also include a start date input field, and an end date input date. Infrastructure changes may include, for example, power outage, network maintenance, etc. Consistent with one embodiment, hardware change input field 250 and/or infrastructure change input field 260 may allow the user to enter information for one or more changes. As shown in FIG. 2, two infrastructure changes may be included. Hardware or infrastructure changes may be completed within a day, and accordingly, the start date and the finish date may be the same date.

Figure 3:
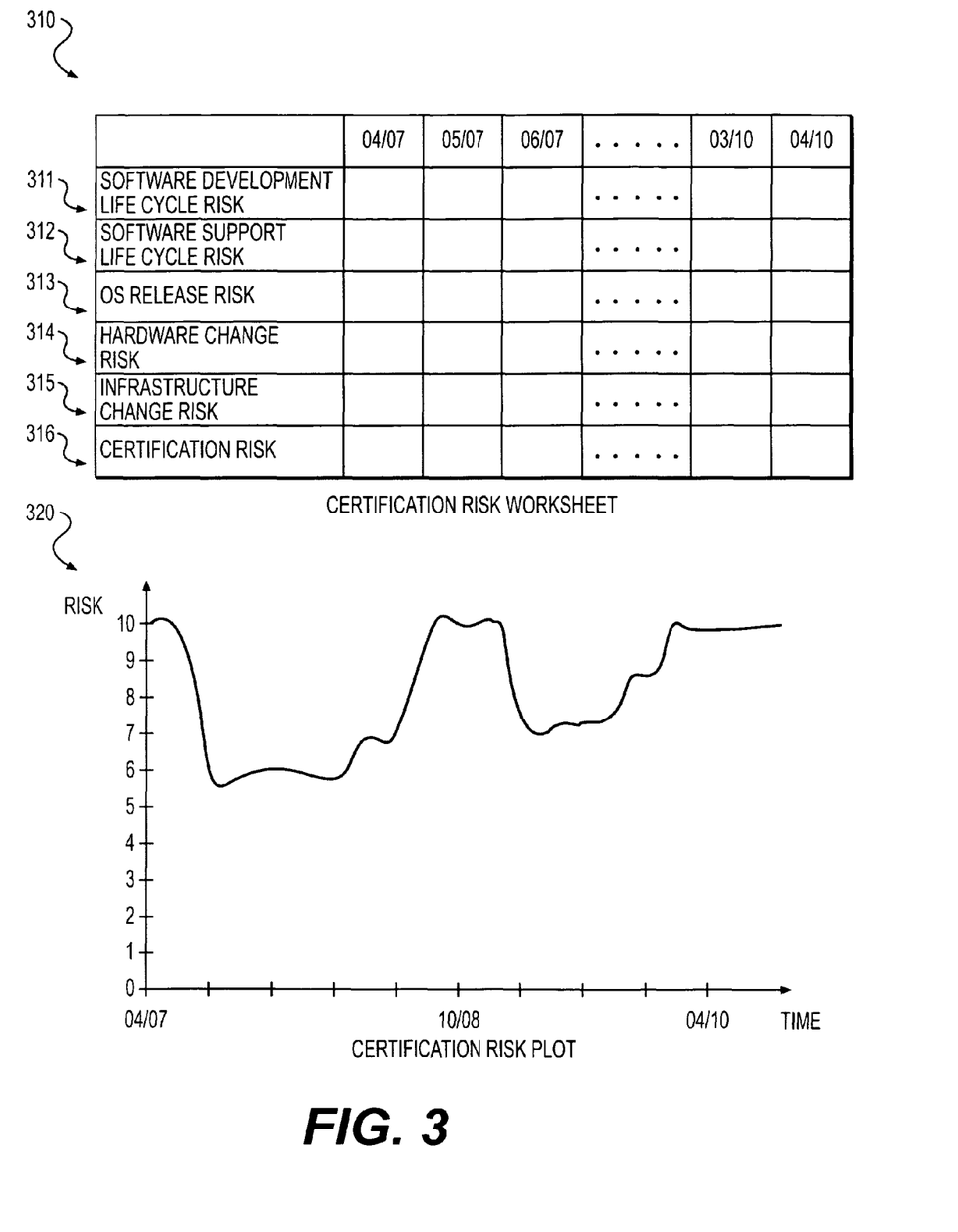
FIG. 3 provides illustrations of a certification risk worksheet and a certification risk plot, according to an exemplary embodiment of the present disclosure.

Based on the input information collected by graphic input interface 200, risk calculating module 22 may be executed to calculate a composite risk, and risk plot generating module 23 may be executed to display the composite risk as a function of time in a plot. FIG. 3 provides illustrations of a certification risk worksheet 310 and a certification risk plot 320, according to an exemplary embodiment of the present disclosure.

Certification risk worksheet 310 may include a software development life-cycle risk row 311, a software support life-cycle risk row 312, an OS release risk row 313, a hardware change risk row 314, an infrastructure change risk row 315, and a software certification composite risk row 316. Each of these rows may include a plurality of fields that correspond to a plurality of discrete time points in the date range received by data range input field 210. For example, by default, thirty-six time points with an interval of a month between every two points may be included in certification risk worksheet 310, for a date range of three years. Consistent with one embodiment, the user may specify a different time interval between every two time points, for example, a week or 10 days, and processor 110 may be configured to create a list of discrete time points and include them in certification risk worksheet 310.

Risk values may be automatically entered in the fields associated with risk rows 311-315 by risk calculating module 22. For example, risk calculating module 22 may retrieve risk values from the risk look-up table according to the user input information entered in graphic input interface 200. After all these fields are filled, risk calculating module 22 may then calculate the composite risk for software certification composite risk row 316. Consistent with one embodiment, the composite risk may be calculated according to a formula pre-programmed in risk calculating module 22. The formula may define a relationship between the composite risk and the plurality of risk factors. For example, the composite risk value may be calculated according to the formula: $R=R_{sd} \times R_h \times R_i + R_{os}$, where R denotes the composite risk value, $R_{sd}$ denotes the risk value for software development life-cycle, $R_h$ denotes the risk value for hardware change, $R_i$ denotes the risk value for infrastructure change, and $R_{os}$ demotes the risk value for operating system release. The formula may be derived based on theories or experience. Alternatively, the formula may also be modeled statistically based on baseline data.

Consistent with one embodiment, for each time point, a risk value may be calculated, based on the risk values associated with the risk factors in risk rows 311-315 at the same time point. For example, the composite risk value at time point 04/07 may be calculated based on risk values entered in risk fields in the column corresponding to time point 04/07. Risk calculating module 22 may be configured to rate each composite risk value in software certification composite risk row 316 based on a rating criteria. The rating criteria may define a plurality of risk levels and each risk level corresponds to a range of risk values. Risk calculating module 22 may be further configured to determine a lowest risk value among all the determined risk values in software certification composite risk row 316. Consistent with one embodiment, the risk values in software certification composite risk row 316 may be shown in different colors, corresponding to the different risk levels. Consistent with one embodiment, the time point corresponding to this lowest composite risk value may be determined as the best time for certifying the software.

After the composite risk is determined, risk plot generating module 23 may be configured to generate certification risk plot 320, based on the calculated composite risk. As shown in FIG. 3, certification risk plot 320 may include a risk axis and a time axis and the composite risk may be displayed as a curve between the two axis. The risk axis may include a risk range of 0-10, where 0 may correspond to a lowest risk level and 10 may correspond to a highest risk level. The time axis may include a plurality of discrete time points, corresponding to the discrete time points listed in certification risk worksheet 310. Risk plot generating module 23 may be configured to draw a curve based on the calculated composite risk in software certification composite risk row 316, as a function of time.

For example, as shown in FIG. 3, the risk curve may include an initial portion of lofty risks, because of an infrastructure change, for example. The risk curve may then include a portion of medium risks, which may be followed by another high-to-lofty risk portion, due to the release of a new OS system and a hardware change, for example. Consistent with one embodiment, risk plot generating module 23 may be further configured to highlight the best time for certifying the software, which corresponds to the lowest composite risk value on the curve. For example, the best certification time may be highlighted by a circle or a cross on the curve, or alternatively on the time axis.

INDUSTRIAL APPLICABILITY

Although the disclosed embodiments are described in association with a software certification risk calculator, the disclosed detection system may be used in any environment where it may be desirable to determine a time-varying composite risk that is influenced by a plurality of risk factors. Specifically, the disclosed risk calculator may include a storage device configured to store a look-up table, and the look-up table may include risk values at a plurality of discrete time points for a plurality of risk factors. The disclosed risk calculator may also include an input interface configured to receive input information of the plurality of risk factors, and the input information may include a timeline associated with changes of each risk factor. The risk calculator may further include a processor coupled to the input interface and the storage device. The processor may be configured to retrieve risk values at a plurality of discrete time points for each risk factor from a look-up table, based on the timeline received. The processor may be further configured to calculate the composite risk using the retrieved risk values based on a formula, and the formula may define a relationship between the composite risk and the plurality of risk factors.

Figure 4:
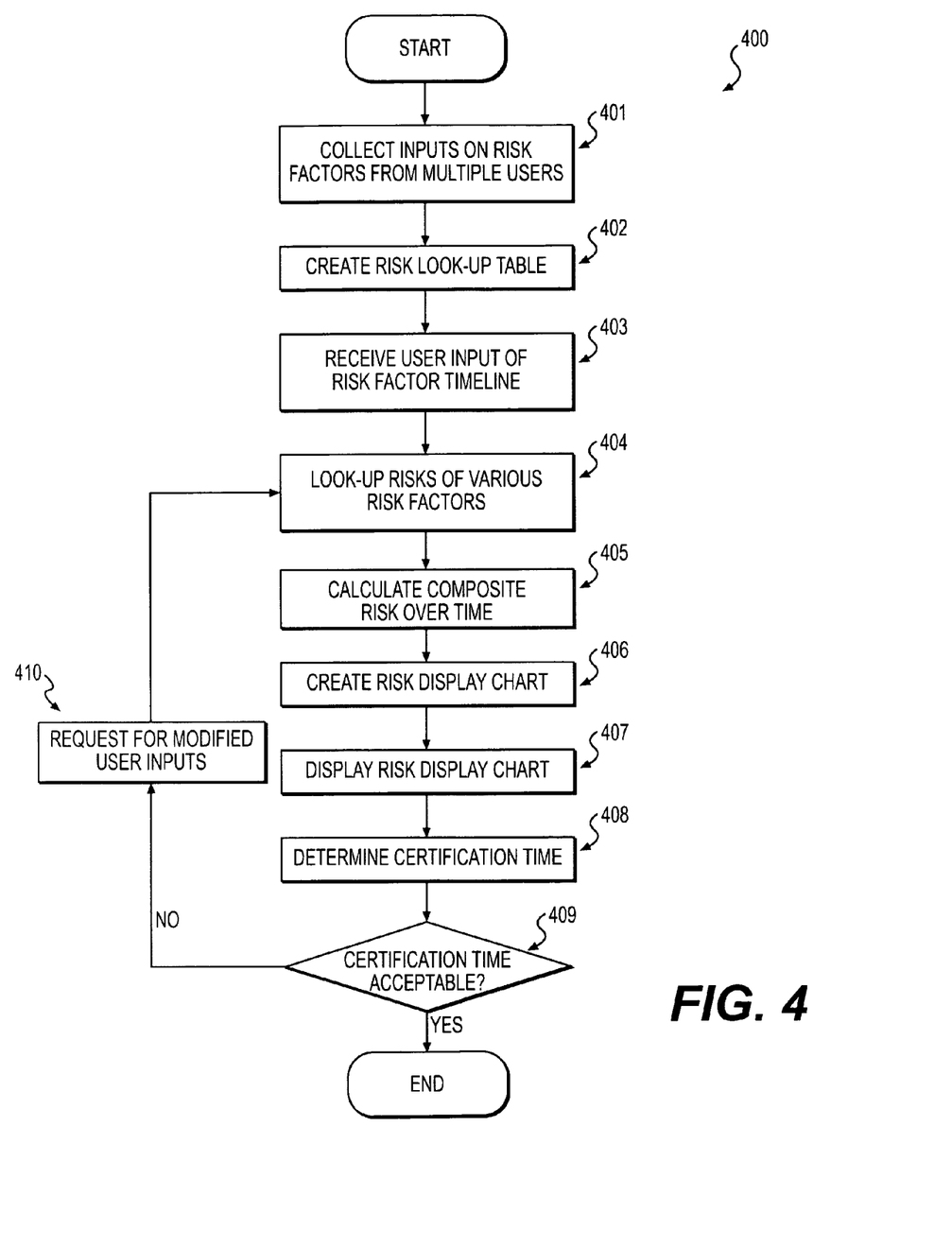
FIG. 4 provides a flowchart of an exemplary operation process of a risk calculator, consistent with the disclosed embodiment shown in FIG. 1.

FIG. 4 provides a flowchart of an exemplary operation process 400 of a risk calculator, consistent with the disclosed embodiment shown in FIG. 1. Process 400 may start when inputs regarding risk factors are collected by risk calculator 10 from multiple users (Step 401). Inputs may be entered from input interface 140 and may be transferred to processor 110 for analysis. For example, processor 110 may be configured to execute risk database generation module 21 to collect inputs regarding risks associated with various risk factors from respective subject matter experts, using a VOB survey tool. Risk inputs associated with operating system release, for example, may be collected from an operating system expert and risk inputs associated with hardware change may be collected from a hardware expert.

After the user inputs are collected, processor 110 may be configured to analyze the input and create a risk look-up table (Step 402). For example, processor 110 may be configured to execute the risk database generation module 21 to analyze the input of risks using an FMEA tool and derive a series of time varying risk values for each risk factor. The derived time varying risk values may be stored as a look-up table in storage device 130 or database 160. Consistent with one disclosed embodiment, the risk values stored in the risk look-up table may be normalized within a range of 0-10, where 0 may correspond to the lowest risk and 10 may correspond to the highest risk.

Processor 110 may be further configured to receive user input information via input interface 140 (Step 403). For example, the user may enter input information in graphic input interface 200 shown on display device 150. The input information may include a date range over which a software certification risk is to be calculated. The input information may further include timelines of changes associated with one or more risk factors, such as existing software development life-cycle input, new software development life-cycle, operating system release, hardware change, infrastructure change, etc.

With the received user input information in graphic input interface 200, processor 110 may execute risk calculating module 22 to retrieve risk values from the risk look-up table according to user input information (Step 404). For example, the risk values may be retrieved at defined discrete time points as listed in certification risk worksheet 310. The retrieved risk values may be automatically entered in risk rows 311-315 of certification risk worksheet 310.

Processor 110 may then execute risk calculating module 22 to calculate a composite risk based on the retrieved risk values, according to a formula pre-programmed in risk calculating module 22 (Step 405). The calculated composite risk may include a series of risk values corresponding to a series of discrete time points as listed in certification risk worksheet 310. Consistent with one embodiment, for each time point, the composite risk value may be calculated based on the risk values associated with the risk factors in risk rows 311-315 at the same time point.

Processor 110 may then execute risk plot generating module 23 to generate a certification risk plot 320 based on the calculated composite risk (Step 406). For example, certification risk plot 320 may include a risk axis and a time axis and the composite risk may be displayed as a curve between the two axis. The time axis may include a plurality of discrete time points, corresponding to the discrete time points listed in certification risk worksheet 310. The generated certification risk plot 320 may be displayed by display device 150 (Step 407).

Processor 110 may be further configured to determine a recommended software certification time based on the calculated composite risk and generated plot (Step 408). Consistent with one embodiment, the recommended software certification time may be determined as the time point that corresponds to the lowest composite risk value in certification risk worksheet 310, or equivalently, the lowest point on the curve in certification risk plot 320. Consistent with one embodiment, processor 110 may execute risk plot generating module 23 to display the recommended software certification time on display device 150.

According to one embodiment of the present disclosure, processor 110 may be further configured to determine if the recommended software certification time is acceptable (Step 409). For example, processor 110 may communicate with input interface 140 to receive a user input. In one embodiment, the user may be directed to a Yes/No question, such as, "is the recommended software risk time acceptable?" The user may be allowed to enter yes or no via input interface 140. Processor 110 may then determine that the recommended software certification time is acceptable (Step 409: Yes), if the user input is yes. Otherwise, if the user input is no, processor 110 may determine that the recommended software certification time is not acceptable (Step 409: No). In another embodiment, processor 110 may communicate with input interface 140 to receive a threshold time range entered by a user. Processor 110 may then compare the recommended software certification time with the threshold time range. If the recommended time is within the threshold time range, processor 110 may then determine that the recommended software certification time is acceptable (Step 409: Yes). Otherwise, processor 110 may determine that the recommended software certification time is not acceptable (Step 409: No).

If the recommended software certification time is determined as not acceptable (Step 409: No), processor 110 may communicate with display device 150 to request a modified user input (Step 410). For example, graphic input interface 200 may be displayed again on display device 150 so that the user may modify the input information, such as timelines associated with various risk factors. Processor 110 may be configured to repeat Steps 404-409 for the updated graphic input interface 200, until the recommended certification time is deemed acceptable. Once the recommended software certification time is determined as acceptable (Step 409: Yes), process 400 may terminate.

Risk calculator 10 in the present disclosure may provide increased accuracy and additional functionalities over conventional systems. For example, the disclosed risk calculator 10 may be capable of considering various types of risk factors due to changes of the software development environment. Therefore, the disclosed risk calculator 10 may provide more accurate risk information. Furthermore, the disclosed risk calculator 10, may account for the fluctuation of risks over time. As a result, the disclosed risk calculator 10 may determine a recommended software certification time that corresponds to the lowest composite risk over a certain time period. In addition, the disclosed risk calculator 10 may provide a user with the opportunity to modify the other factors of the software development environment, such that an acceptable certification time may result.

It will be apparent to those skilled in the art that various modifications and variations can be made to the disclosed risk calculator 10 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for certifying software based on composite risk, the method comprising:
receiving information for a plurality of risk factors associated with the software, wherein the information includes a timeline for each risk factor, the timeline including a plurality of discrete time points, and the plurality of risk factors include two or more of a software development life-cycle risk factor, an operating system release risk factor, a hardware change risk factor, and an infrastructure change risk factor;

determining risk values indicative of risk levels of each risk factor associated with the plurality of discrete time points;

calculating, using at least one computer processor, a composite risk based on the plurality of risk factors and using the determined risk values and a relationship between the composite risk and the plurality of risk factors, wherein the composite risk includes a plurality of composite risk values associated with the plurality of discrete time points; and identifying a recommended software certification time, the recommended software certification time corresponding to a lowest value of the calculated composite risk.

2. The method of claim 1, further including creating a risk look-up table, including:

collecting inputs regarding the risk values of each risk factor from multiple users;

determining the risk values of each risk factor at the plurality of discrete time points based on the collected user inputs; and storing the risk values of each risk factor in the risk look-up table, wherein each risk value corresponds to a discrete time point.

3. The method of claim 2, wherein the user inputs are collected using a voice of business (VOB) survey.

4. The method of claim 2, wherein the risk values are determined using a failure mode effect analysis (FMEA).

5. The method of claim 1, further including adjusting the timeline of one or more risk factors, if the identified time point is not within a threshold time range.

6. The method of claim 1, further including:

creating a plot using the calculated composite risk, wherein the plot includes a risk axis and a time axis and the calculated composite risk is displayed as a risk-time curve; and displaying the plot.

7. The method of claim 1, wherein calculating the composite risk further includes rating the composite risk based on a rating criteria, wherein the rating criteria defines a plurality of risk levels and each risk level corresponds to a range of risk values.

8. The method of claim 1, further including adjusting the timelines of one or more risk factors until the recommended software certification time is within a threshold time range.

9. The method of claim 1, wherein the relationship is defined by $R=R_{sd} \times R_h \times R_i + R_{os}$, wherein R denotes a composite risk value, $R_{sd}$ denotes a risk value for the software development life-cycle, $R_h$ denotes a risk value for the hardware change, $R_i$ denotes a risk value for the infrastructure change, and $R_{os}$ denotes a risk value for the operating system release.

10. A risk calculator for certifying software based on composite risk, the risk calculator comprising:

a storage device configured to store information for a plurality of risk factors associated with the software, including:

a timeline for each risk factor, the timeline including a plurality of discrete time points; and risk values indicative of risk levels of each risk factor associated with the plurality of discrete time points, wherein the plurality of risk factors include two or more of a software development life-cycle risk factor, an operating system release risk factor, a hardware change risk factor, and an infrastructure change risk factor; and a processor coupled to the storage device, and being configured to:

determine risk values indicative of risk levels of each risk factor associated with the plurality of discrete time points; and calculate a composite risk based on the plurality of risk factors, using the determined risk values and a relationship between the composite risk and the plurality of risk factors, wherein the composite risk includes a plurality of composite risk values associated with the plurality of discrete time points; and identify a recommended time to certify the software corresponding to a desired value of the plurality of composite risk values.

11. The risk calculator of claim 10, wherein the processor is further configured to create a plot using the calculated composite risk, wherein the plot includes a risk axis and a time axis and the calculated composite risk is displayed as a risk-time curve.

12. The risk calculator of claim 11, further including a display device coupled to the processor, wherein the display device is configured to display the plot.

13. The risk calculator of claim 10, wherein the processor is further configured to:

collect inputs regarding the risk values of each risk factor from multiple users;

determine the risk values of each risk factor at the plurality of discrete time points based on the collected user inputs; and store the risk values of each risk factor in a risk look-up table.

14. The risk calculator of claim 10, wherein the risk calculator further includes an input interface configured to receive a threshold time range, and wherein the processor is further configured to:

identify a time point, among the plurality of discrete time points, that corresponds to a lowest composite risk value; and adjust the timelines of one or more risk factors, if the identified time point is not within the threshold time range.

15. The risk calculator of claim 10, wherein the storage device is further configured to store a rating criteria that defines a plurality of risk levels with each risk level corresponding to a range of risk values, and wherein the processor is further configured to rate the composite risk based on the rating criteria.

16. A computer readable medium having stored thereon instructions for causing a computer executing the instructions to perform a method for certifying software based on composite risk, the method including:

receiving information for a plurality of risk factors associated with the software, wherein the information includes a timeline for each risk factor, the timeline including a plurality of discrete time points, and the plurality of risk factors include two or more of a software development life-cycle risk factor, an operating system release risk factor, a hardware change risk factor, and an infrastructure change risk factor;

determining risk values indicative of risk levels of each risk factor associated with the plurality of discrete time points; and calculating a composite risk based on the plurality of risk factors, using the determined risk values and a relationship between the composite risk and the plurality of risk factors, wherein the composite risk includes a plurality of composite risk values associated with the plurality of discrete time points; and identifying a recommended time to certify the software corresponding to a desired value of the plurality of composite risk values.

17. The computer readable medium of claim 16, the method further including adjusting the timeline of one or more risk factors, if the identified time point is not within a threshold time range.

18. The computer readable medium of claim 16, the method further including:

creating a plot using the calculated composite risk, wherein the plot includes a risk axis and a time axis and the calculated composite risk is displayed as a risk-time curve; and displaying the plot.

* * * * *